United States Patent
Sano et al.

(10) Patent No.: US 6,616,713 B2
(45) Date of Patent: Sep. 9, 2003

(54) METHOD FOR FABRICATING CHIP TYPE SOLID ELECTROLYTIC CAPACITOR AND APPARATUS FOR PERFORMING THE SAME METHOD

(75) Inventors: Mitsunori Sano, Tokyo (JP); Takashi Kono, Tokyo (JP); Kazunori Watanabe, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 09/987,251

(22) Filed: Nov. 14, 2001

(65) Prior Publication Data

US 2002/0061613 A1 May 23, 2002

(30) Foreign Application Priority Data

Nov. 22, 2000 (JP) ........................................ 2000-356020

(51) Int. Cl.$^7$ .............................. H01G 9/00; H01G 9/10
(52) U.S. Cl. ...................... 29/25.03; 361/520; 361/540
(58) Field of Search ................. 29/25.03; 361/516–520, 361/540, 538, 813, 310, 306.1

(56) References Cited

U.S. PATENT DOCUMENTS 5,736,710 A  * 4/1998 Ikeda et al.
6,141,205 A  * 10/2000 Nutzman et al.
6,193,765 B1 * 2/2001 Nakanishi et al.
6,236,561 B1 * 5/2001 Ogino et al.

FOREIGN PATENT DOCUMENTS

JP    3084895    7/2000

* cited by examiner

Primary Examiner—Ha Tran Nguyen
(74) Attorney, Agent, or Firm—Sughrue Mion, PLLC

(57) ABSTRACT

An anode lead 17 extending from a capacitor body 18 of a capacitor element 14 is mounted on a connecting portion 21 of an anode terminal 12 and the anode lead 17 and the connecting portion 21 are welded together by laser light B. The welding operation is performed by laser light B in a state where the anode lead 17 is urged to the connecting portion 21 in a region between said anode lead and said connecting portion. Alternatively, the welding operation is performed by laser light B in a state where a reflection plate having a slot and functioning to reflect reflected laser light is arranged in a region between the connecting portion and the capacitor body while the anode lead is received in said slot.

22 Claims, 8 Drawing Sheets

METHOD FOR FABRICATING CHIP TYPE SOLID ELECTROLYTIC CAPACITOR AND APPARATUS FOR PERFORMING THE SAME METHOD

BACKGROUND OF THE INVENTION

1. Field of the Invention

The present invention relates to a method for fabricating a chip type solid electrolytic capacitor and an apparatus for performing the same method, and more particularly to a welding method for connecting an anode terminal and an anode lead of the solid electrolytic capacitor.

2. Description of the Prior Art

An example of a conventional method for fabricating a chip type solid electrolytic capacitor, which may be referred to as merely "chip type capacitor" sometimes in this description, is disclosed in Japanese Patent No. 3084895. The fabrication method of chip type capacitor disclosed therein includes the step of putting an anode lead extending from a capacitor element on a connecting portion, which is formed by bending up a portion of the anode terminal, and the step of welding the connecting portion and the anode lead together by laser light.

However, since, in the conventional method, the connecting portion and the anode lead are positioned relatively with loose contact of them and welded together by laser light, there may be a case where the anode lead cannot be in sufficient area contact with the connecting portion during the welding operation. If the welding is performed in such state, there is a problem that a sufficient bonding strength cannot be obtained and, as a result, the quality of a chip type capacitor is degraded.

Further, in the disclosed conventional fabrication method, there may be a case where, in welding the anode lead and the connecting portion together by laser light, the laser light may be reflected by a weld portion and reflected laser light may irradiate other portion of the capacitor element undesirably. Particularly, when the reflected laser light irradiates the capacitor body of the capacitor element, a problem that the quality of the capacitor body and hence the chip type capacitor is degraded occurs.

SUMMARY OF THE INVENTION

The present invention was made in view of the state of the prior art and has an object to provide a method for fabricating a high quality chip type solid electrolytic capacitor and a fabrication apparatus for performing the same fabrication method.

In order to achieve the above-mentioned object, a fabrication method of a chip type solid electrolytic capacitor, according to a first aspect of the present invention, is featured by comprising the steps of putting an anode lead, which extends from a capacitor body of a capacitor element of the chip type solid electrolytic capacitor on a connecting portion, which is formed by bending a portion of an anode terminal and welding portions of the connecting portion and the anode lead together with using laser light while the anode lead is urged to the connecting portion in a region between the weld portion of the connecting portion and the capacitor body.

Since the laser light welding operation is performed while the anode lead is urged to the connecting portion, it is possible to always perform the welding operation while the anode lead is in firm contact with the connecting portion. Therefore, degradation of bonding strength can be avoided. Consequently, it is possible to obtain a high quality chip type solid electrolytic capacitor.

Further, since the anode lead is pressingly held between the weld portion and the capacitor body, it is possible to improve the freedom of irradiating direction of laser light. On the other hand, it has been known in the fabrication of chip type solid electrolytic capacitors that a plurality of capacitor bodies bonded to a metal plate of such as aluminum, which may be referred to as "aluminum holder", are processed through respective fabrication steps. In such case, anode leads thereof are not in one and the same horizontal plane due to bending or warping of the bonding portions of the anode leads to the aluminum holder and, therefore, the contacting state of the anode leads with the connecting portions is unstable. In the present invention, when the pressing force is selected to a value enough to correct such bending and/or warping of the anode lead, the bending and/or warping of the anode lead can be corrected, so that the welding operation can be performed in the state where the anode lead is always in firm contact with the connecting portion.

A fabrication method for fabricating a chip type capacitor, according to a second aspect of the present invention, including the step of mounting an anode lead extending from a capacitor body of a capacitor element on a connecting portion formed by bending up a portion of an anode terminal and welding the connecting portion and the anode lead together by irradiating them with laser light, is featured by that the laser welding operation is performed in the state where a reflection plate having a slot and functioning to reflect reflected laser light is arranged between a weld portion of the connecting portion to be welded and the capacitor body while the anode lead is received in the slot.

Since, in this case, the laser welding operation is performed in the state where the reflection plate having the slot and functioning to reflect reflected laser light is arranged between the weld portion and the capacitor body while the anode lead is received in the slot, the reflection plate prevent irradiation of the capacitor body with reflected laser light, so that degradation of the capacitor body is prevented.

Consequently, it is possible to obtain a high quality chip type solid electrolytic capacitor.

A fabrication method for fabricating a chip type capacitor, according to a third aspect of the present invention, including the steps of mounting an anode lead extending from a capacitor body of a capacitor element on a connecting portion formed by bending up a portion of an anode terminal and welding a weld portion of the connecting portion and the anode lead together by irradiating them with laser light, is featured by that the laser welding operation is performed in the state where a reflection plate having a slot is arranged in a region between the weld portion and a capacitor body while the anode lead is received in the slot and the anode lead is urged to the connecting portion.

Since, in this case, the laser welding operation is performed in the state where the reflection plate having the slot is arranged in the region between weld portion and the capacitor body while the anode lead is received in the slot such that the anode lead is urged to the connecting portion, the bending and/or warping of the anode lead, which occurs when a plurality of capacitor bodies bonded to an aluminum holder are processed through respective fabrication steps and makes the contact of the anode leads with the connecting portions unstable, can be corrected and the welding operation can be performed in the state where the anode lead is always in firm contact with the connecting portion. As a result, degradation of bonding strength between the anode lead and the connecting portion can be avoided. Further, since the reflection plate prevents irradiation of the capacitor body with reflected laser light, degradation of the quality of the capacitor body is prevented.

Therefore, it is possible to obtain a high quality chip type solid electrolytic capacitor.

A fabrication method for fabricating a chip type capacitor, according to a fourth aspect of the present invention, relates to any one of the first to third aspects and is featured by that the connecting portion includes a welding notch for receiving the anode lead and welding side portions, which are formed on both sides of the welding notch and form a weld portion, and laser light irradiates only the weld portion.

Since, in this case, only the weld portion of the connecting portion is irradiated with laser light, the weld portion of the connecting portion is melted and the molten material flows around the anode lead in the welding notch, so that the bonding strength is stabilized and the utility of thereof is improved. Further, it becomes possible to restrict temperature rise of the anode lead to the irreducible minimum of the demand to thereby minimize temperature rise of the capacitor body of the capacitor element due to the temperature rise of the anode lead. Therefore, degradation of the quality of the capacitor body can be avoided.

Consequently, it becomes possible to obtain a higher quality chip type solid electrolytic capacitor.

A fabrication method for fabricating a chip type capacitor, according to a fifth aspect of the present invention, relates to any one of the first to third aspects of the present invention and is featured by that the connecting portion is irradiated with low energy density laser light and the anode lead is irradiated with high energy density laser light.

Since, in this case, the connecting portion is irradiated with low energy density laser light and the anode lead is irradiated with high energy density laser light, it is possible to desirably melt and bond the connecting portion and the anode lead, which have different melting points.

Therefore, it is possible to obtain a higher quality chip type solid electrolytic capacitor.

A fabrication apparatus for fabricating a chip type capacitor, according to a sixth aspect of the present invention in which an anode lead extending from a capacitor body of a capacitor element is mounted on a connecting portion, which is formed by bending up a portion of an anode terminal, and laser welding means welds the anode lead and the connecting portion together by laser light emitted therefrom, is featured by comprising pressing means for pressing the anode lead to the connecting portion in a region between a weld portion of the connecting portion and the capacitor body to thereby urge the anode lead to the connecting portion.

With this construction, it is possible to perform the laser light welding operation while the anode lead is urged to the connecting portion by the pressing means, so that it is possible to weld the anode lead to the connecting portion while the anode lead is in firm contact with the connecting piece. Therefore, degradation of bonding strength is prevented.

Consequently, it is possible to obtain a high quality chip type solid electrolytic capacitor.

Further, since the anode lead is pressed to the connecting portion in the region between the weld portion and the capacitor body, it is possible to improve the freedom of irradiating direction of laser light. In this case, the bending and/or warping of the anode lead, which occurs when a plurality of capacitor bodies bonded to an aluminum holder are processed through respective fabrication steps and makes the contact of the anode leads with the connecting portions unstable, can be corrected and the welding operation can be performed in the state where the anode lead is always in firm contact with the connecting portion.

A fabrication apparatus for fabricating a chip type capacitor, according to a seventh aspect of the present invention in which an anode lead extending from a capacitor body of a capacitor element is mounted on a connecting portion, which is formed by bending up a portion of an anode terminal, and laser welding means welds the anode lead and the connecting portion together by laser light emitted therefrom, is featured by comprising reflection plate arranging means for arranging a reflection plate having a slot in a region between a weld portion of the connecting portion to be laser-welded and the capacitor body, which are to be welded together by laser light, and functioning to reflect reflected laser light while the anode lead is fittingly received in the slot.

With this fabrication apparatus, the welding operation can be performed by the laser welding means in the state where the reflection plate is arranged in the region between the weld portion to be laser-welded and the capacitor body while the anode lead is received in the slot. Therefore, the reflection plate prevents irradiation of the capacitor body with reflected laser light, so that degradation of the capacitor body is prevented.

Consequently, it is possible to obtain a high quality chip type solid electrolytic capacitor.

A fabrication apparatus for fabricating a chip type capacitor, according to an eighth aspect of the present invention in which an anode lead extending from a capacitor body of a capacitor element is mounted on a connecting portion, which is formed by bending up a portion of an anode terminal, and laser welding means welds the anode lead and the connecting portion together by laser light emitted therefrom, is featured by comprising reflection plate arranging means for arranging a reflection plate having a slot in a region between a weld portion to be laser-welded and the capacitor body and functioning to reflect reflected laser light while the anode lead is fittingly received in the slot, wherein the reflection plate arranging means urges the anode lead to the connecting portion.

With this fabrication apparatus, since the reflection plate having the slot is arranged by the reflection plate arranging means in the region between the weld portion and the capacitor body while the anode lead is fittingly received in the slot to urge the anode lead to the connecting portion, the bending and/or warping of the anode lead, which occurs when a plurality of capacitor bodies bonded to an aluminum holder are processed through respective fabrication steps and makes the contact of the anode leads with the connecting portions unstable, can be corrected, the welding operation can be performed in the state where the anode lead is always in firm contact with the connecting portion. As a result, unstableness and degradation of the bonding strength can be avoided. Further, since the reflection plate prevents irradiation of the capacitor body of the capacitor element with reflected laser light, degradation of the quality of the capacitor body is prevented.

Consequently, it is possible to obtain a high quality chip type solid electrolytic capacitor.

A fabrication apparatus of a chip type capacitor, according to a ninth aspect of the present invention, relates to any one of the sixth to eighth aspects of the present invention and is featured by that the connecting portion includes a welding notch in which the anode lead is received and welding side portions formed on both sides of the welding notch and the laser welding means irradiates only the welding side portions with laser light.

Since the laser welding means irradiates only the welding side portions of the connecting portion with laser light, the welding side portions are melted and flow around the anode lead, so that the bonding strength is stabilized and the utility of thereof is improved. Further, it becomes possible to restrict temperature rise of the anode lead to the irreducible minimum of the demand to thereby minimize temperature rise of the capacitor body of the capacitor element due to the temperature rise of the anode lead. Therefore, degradation of the quality of the capacitor body can be avoided.

Consequently, it becomes possible to obtain a higher quality chip type solid electrolytic capacitor.

A fabrication apparatus of a chip type capacitor, according to a tenth aspect of the present invention, relates to any one of the sixth to eighth aspects of the present invention and is featured by that the laser welding means irradiates the connecting portion with low energy density laser light and the anode lead with high energy density laser light.

Since the laser welding means irradiates the connecting portion with low energy density laser light and the anode lead with high energy density laser light, it is possible to desirably melt and bond the connecting portion and the anode lead, which have different melting points.

Therefore, it is possible to obtain a higher quality chip type solid electrolytic capacitor.

DETAILED DESCRIPTION OF THE PREFERRED EMBODIMENTS

Figure 1:
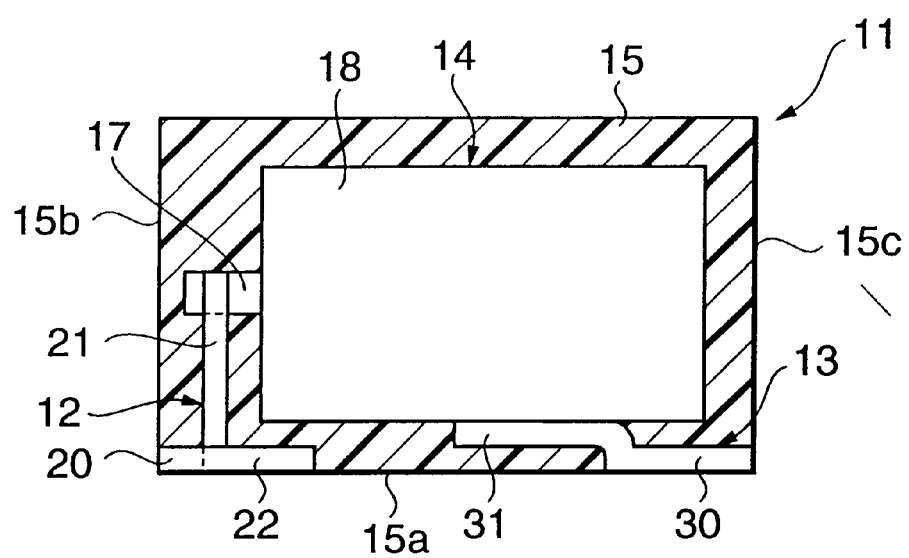
FIG. 1 is a cross sectional view of a chip type capacitor fabricated according to an embodiment of the present invention.

FIG. 1 is a cross section of a chip type solid electrolyte capacitor 11 according to an embodiment of the present invention. The chip type capacitor 11 is constructed with a capacitor element 14, an anode terminal 12, a cathode terminal 13 and an external resin 15 covering the anode terminal 12, the cathode terminal 13 and the capacitor element 14.

The capacitor element 14 includes a columnar anode lead 17 formed by a tantalum wire and a rectangular parallelepiped capacitor body 18. The anode lead 17 is buried in a center portion of one side surface of the capacitor element 18 and extends in one direction from the center portion of the one side surface of the capacitor body 18.

The external resin 15 has substantially a rectangular parallelepiped configuration and is mounted on a printed circuit board (not shown) with a mounting surface 15a thereof being in contact with the printed circuit board.

The anode terminal 12 and the cathode terminal 13 are formed by punching press of a flat plate having uniform thickness, which is formed by a solder-plated metal plate of an alloy of nickel (42%) and iron. The anode terminal 12 has a bottom plate portion 22, a connecting portion 21 and a pair of side portions 20. The bottom plate portion 22 is coplanar with the mounting surface 15a of the external resin 15 and exposed externally. The connecting portion 21 is formed by bending up a center portion of the bottom plate portion 22 in a widthwise direction of the capacitor element (in a direction perpendicular to the drawing sheet in FIG. 1) and is connected to the anode lead 17 of the capacitor element 14. The paired side portions 20 are formed by portions of the bottom plate portion 22, which are left on both sides of an opening resulting from the bending-up of the connecting portion 21.

Figure 2:
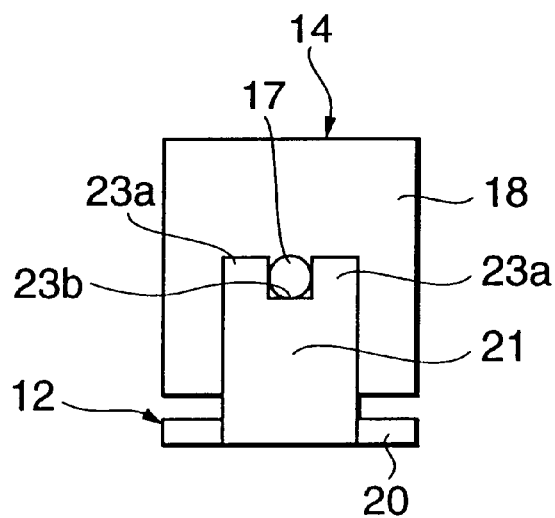
FIG. 2 is a front view of a chip type capacitor fabricated according to an embodiment of the present invention, showing an anode terminal and a capacitor element of the chip type capacitor.

A pair of welding side portions 23a is formed in an upper edge of the connecting portion 21 by notching a center portion thereof to form a welding notch 23b. That is, the welding side portions 23a are provided on both side of the welding notch 23b as shown in FIG. 2. The upper edge portion of the connecting portion 21, which includes the welding side portions 23a and the welding notch 23b, will be referred to as a weld portion.

The anode lead 17 of the capacitor element 14 is bonded to the connecting portion 21 by laser welding while being received in the welding notch 23b. The configuration of the connecting portion 21 is not limited to that shown in FIG. 2. For example, the connecting piece may take an L form having only one welding portion 23a.

The cathode terminal 13 includes a bottom plate portion 30 and a mounting plate portion 31. A lower surface of the bottom plate portion 30 is coplanar with the mounting surface 15a of the external resin 15 and exposed externally. An end face of the bottom plate portion 30 is coplanar with the other side surface 15c of the external resin 15 in a lengthwise direction of the capacitor element (in a lateral direction in FIG. 1) and exposed externally. The mounting plate portion 31 is in a level higher than that of the bottom plate portion 30 and extends in parallel to the bottom plate portion 30. A lower surface of the capacitor body 18 of the capacitor element 14 is supported by the mounting plate portion 31. Although not shown, the bottom plate portion 30 and the mounting plate portion 31 are coated with an electrically conductive adhesive such as silver paste and the capacitor body 18 of the capacitor element 14 is bonded to the cathode terminal 13 by the electrically conductive adhesive.

Now, the fabrication method for fabricating the above mentioned chip type solid electrolytic capacitor 11 and an apparatus for performing the fabrication method according to the present invention would be described.

Figure 3:
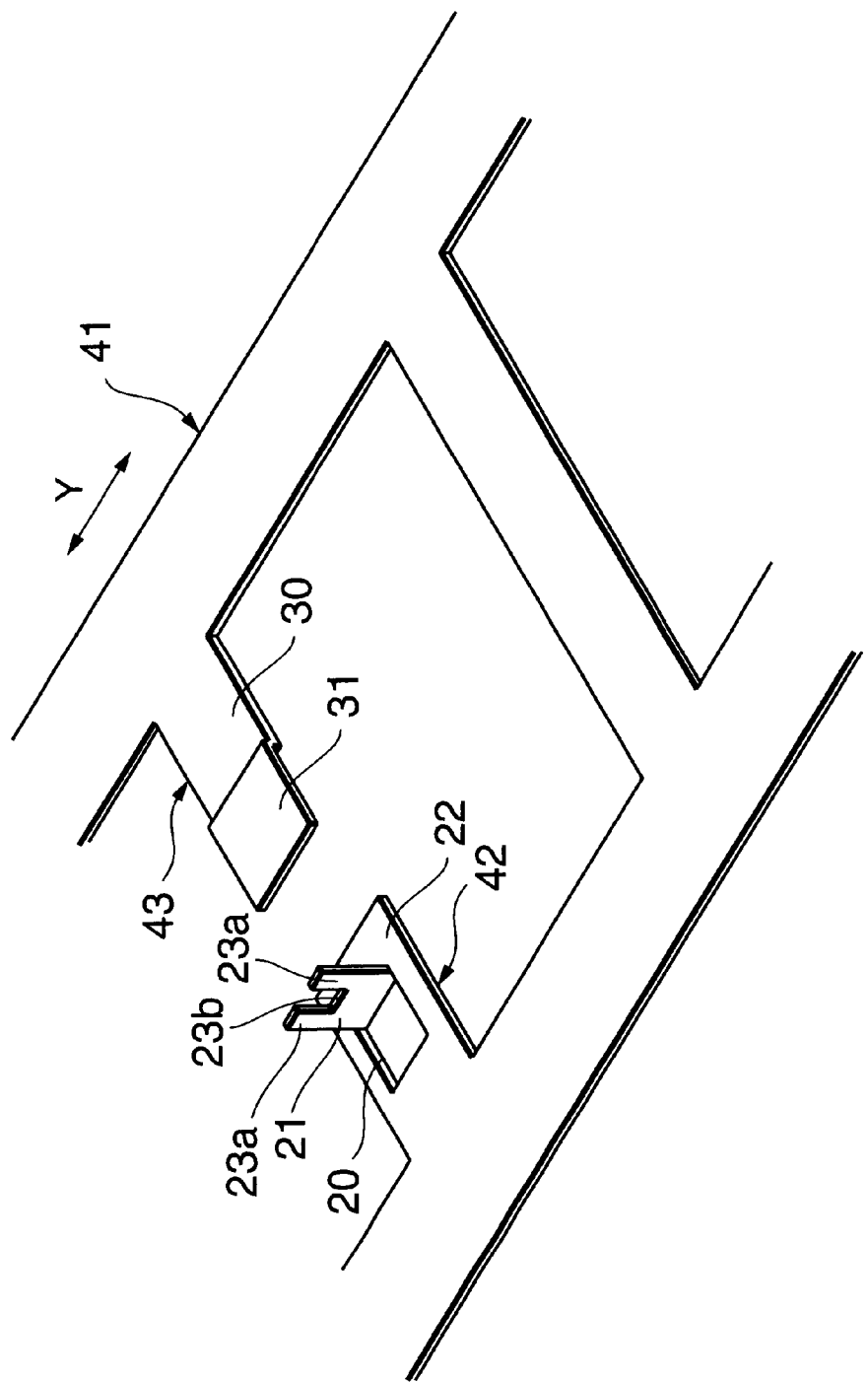
FIG. 3 is a perspective view of a reed frame of a chip type capacitor fabricated according to an embodiment of the present invention.

As shown in FIG. 3, an anode lead terminal 42 and a cathode lead terminal 43 opposing to the anode lead terminal 42 are formed in a solder-plated flat reed frame 41 by punching-press thereof. In this punching press of the solder-plated flat reed frame 41, the connecting portion 21 having the welding side portions 23*a* and the welding notch 23*b* in a portion of the bottom plate portion 22 on the side of the cathode lead terminal 43 is formed by punching-press of the bottom plate portion 22 while the side portions 20 are left and, simultaneously therewith, the bottom plate portion 30 and the mounting plate portion 31 of the cathode terminal 13 are formed in the cathode lead terminal 43. The bottom plate portion 22 of the anode terminal 13 and the bottom plate portion 30 of the cathode terminal 13 are separated from the reed frame by cutting in a later step. Doubled chain lines in FIG. 4, etc show the cutting lines.

The mutually opposing anode lead terminal 42 and the cathode lead terminal 43 of the reed frame 41 are used to form the anode terminal 12 and the cathode terminal 13 of one chip type solid electrolytic capacitor 11. It should be noted that a plurality of paired anode lead terminals and cathode lead terminals are formed in parallel in the reed frame 41 in the widthwise direction of the capacitor (Y direction in FIG. 3).

Figure 4:
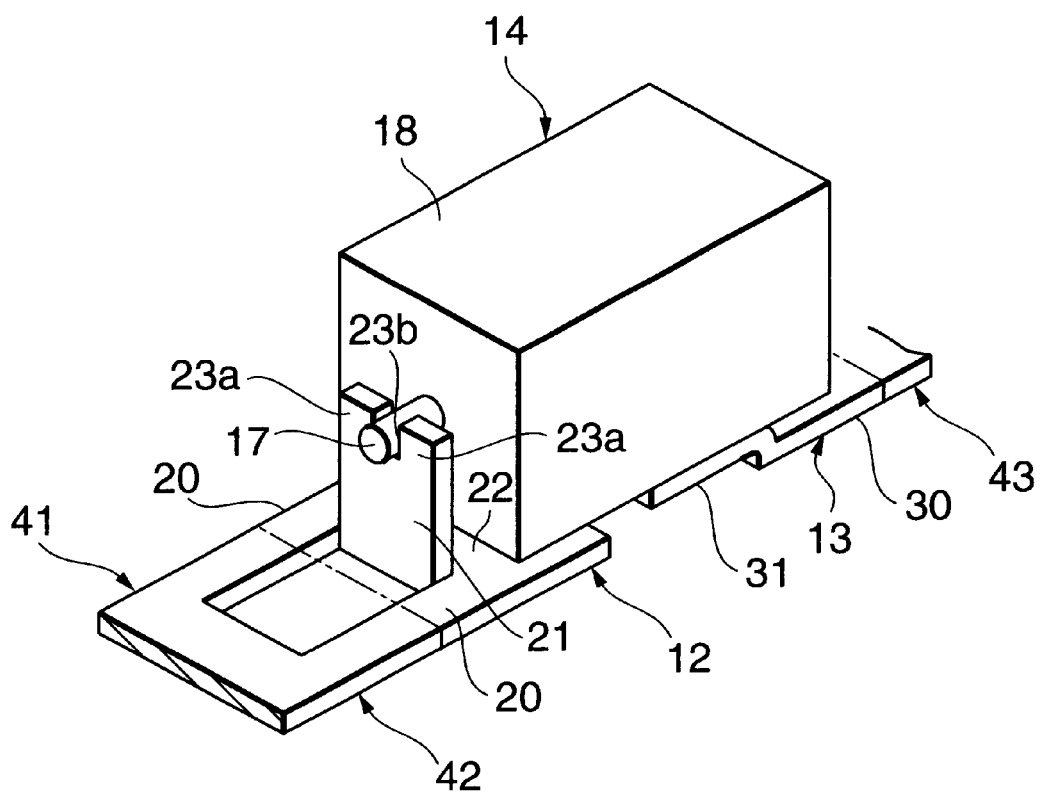
FIG. 4 is a perspective view of a capacitor element of a chip type capacitor fabricated according to an embodiment of the present invention, arranged on a reed frame.

As shown in FIG. 4, the anode and cathode of the capacitor body 18 of the capacitor element 14 are connected to the paired anode lead terminal 42 and cathode lead terminal 43 of the reed frame 41, respectively. That is, the upper surfaces of the bottom plate portion 30 and the mounting plate portion 31 of the cathode lead terminal 43 are coated with the electrically conductive adhesive such as silver paste and the capacitor body 18 of the capacitor element 14 is adhered to the cathode lead terminal 43 through the electrically conductive adhesive.

Thereafter, the anode lead 17 of the capacitor element 14 is put in the welding notch 23*b* of the connecting portion 21 of the anode lead terminal 42 and the connecting portion 21 and the anode lead 17 are welded together by laser light.

Now, the apparatus and method according to the present invention, which are to be used in this welding step, will be described.

Figure 5:
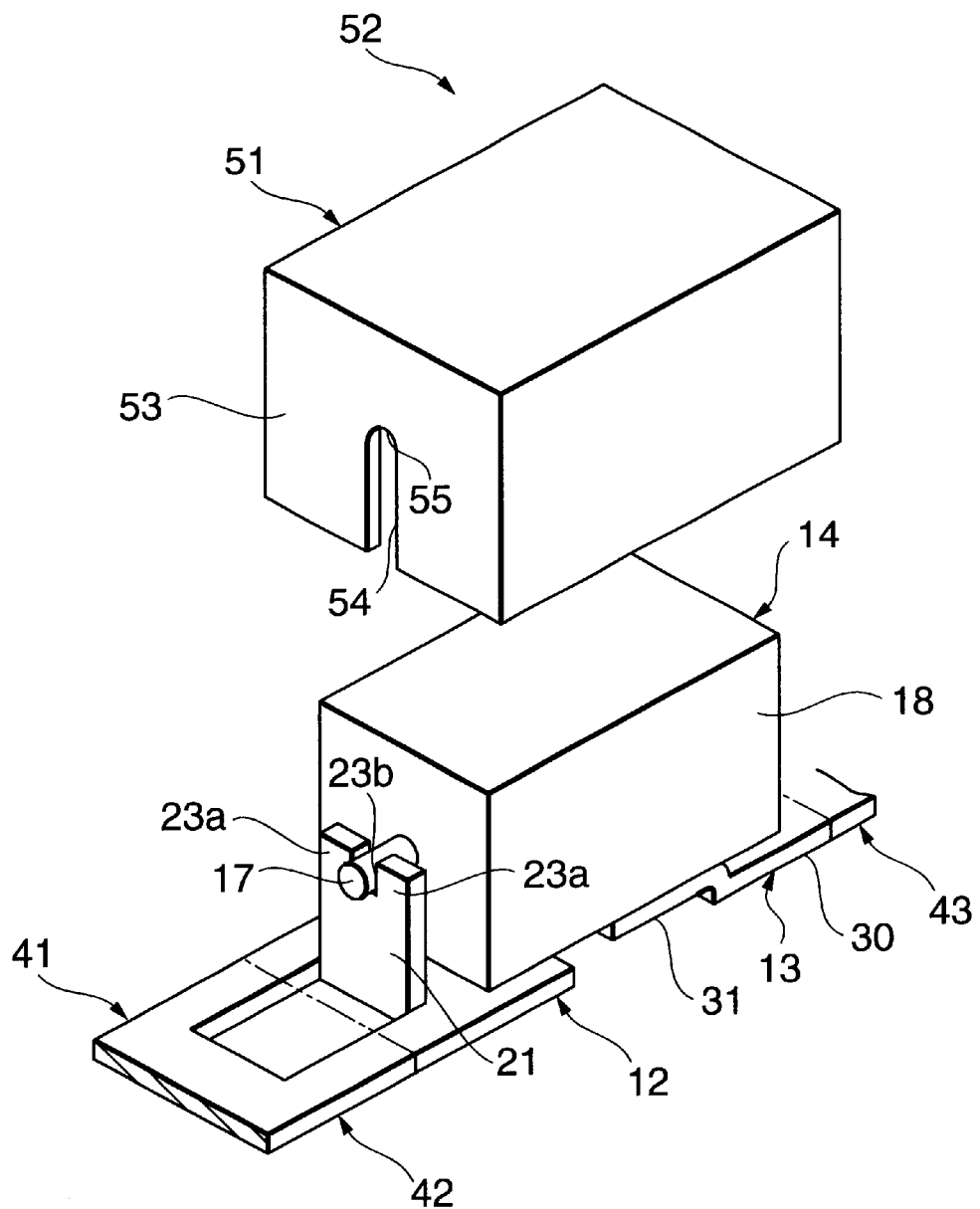
FIG. 5 is a perspective view of a fabrication apparatus according to an embodiment of the present invention, showing a reflector arranging device, a reed frame and a capacitor element.

As shown in FIG. 5, the fabrication apparatus includes a reflector 51 in the shape of a box having a lower side open and a reflector arranging mechanism 52 including pressing means and reflection plate arranging means, etc., (not shown), the reflector arranging mechanism 52 includes an elevator mechanism (not shown) for vertically moving the reflector 51 to selectively cover the capacitor body 18 of the capacitor element 14 thereby.

The reflector 51 includes a reflection plate 53 arranged between the welding side portions 23*a* of the connecting portion 21 of the anode lead terminal 42 and the capacitor body 18 of the capacitor element 14 to reflect undesirably reflected laser light during the laser welding operation when the reflector 51 is lowered to cover the capacitor body 18. The reflector 51 may take other configuration than the box shape. For example, the reflector 51 may be constructed with only the reflection plate 53.

The reflection plate 53 is thin enough to not stress the welding side portions 23*a* and the capacitor body 18 when it is put between them. Further, a slot 54 is formed in a front side of the reflection plate 53. The slot 54 functions to fittingly hold the anode lead 17 of the capacitor element when the reflection plate 53 is put in a region between the welding side portions 23*a* and the capacitor body 18.

When the reflector 51 is arranged by the reflector arranging mechanism 52 while the anode lead 17 is received in the slot 54 of the reflection plate 53, the anode lead 17 is pressed down by an end of the slot 54 of the reflection plate 53. As a result, the anode lead 17 is urged to the connecting portion 21. Incidentally, when diameter of the anode lead 17 formed of tantalum is 0.15 mm and thickness of the anode lead terminal 42 including the connecting portion 21 formed of an alloy of nickel (42%) and iron is 0.08 mm, pressing force exerted on the anode lead 17 by the reflection plate 53 is in a range from 5 to 50 MPa, with which bending and warping of the anode lead 17 can be corrected.

The reflector 51 is formed of a metal material such as copper, which has high thermal conductivity and high reflectivity. Further, it is preferable that an outside surface of the reflection plate 53, that is, a surface thereof opposing to the welding side portions 23*a*, is mirror-polished in order to improve the reflectivity.

Figure 6:
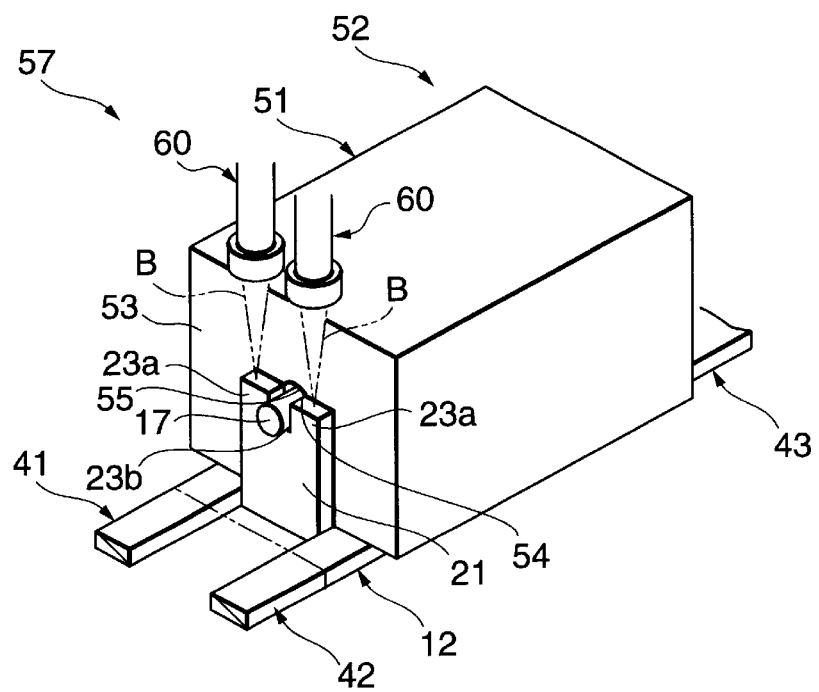
FIG. 6 is a perspective view of a fabrication apparatus according to an embodiment of the present invention, showing a reflector arranging device, a reed frame and a capacitor element.
Figure 7:
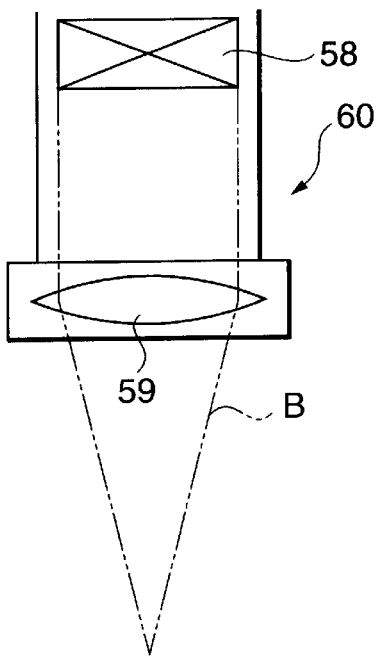
FIG. 7 is a schematic cross section of a laser welder of a fabrication apparatus according to an embodiment of the present invention.

The fabrication apparatus according to the present invention includes a laser welder 57 for welding the connecting portion 21 and the anode lead 17 together, as shown in FIG. 6. The laser welder 57 includes a pair of laser irradiating portions 60 each including a laser oscillator 58 for generating laser light B and a condenser lens 59 for condensing laser light generated by the laser oscillator 58, as shown in FIG. 7. The laser irradiating portions 60 are arranged in parallel to each other in the widthwise direction of the capacitor and arranged above the reed frame 41 in a predetermined position thereof, as shown in FIG. 6.

The laser welder 57 functions to weld the anode lead 17 and the welding side portions 23*a* on both sides of the welding notch 23*b* of the connecting portion 21 together by irradiating the welding side portions 23*a* with laser light to fuse the welding side portions 23*a* such that the molten material of the welding side portions 23*a* flows around the anode lead 17. Incidentally, the reflection plate 53 of the reflector 51 functions to shield laser light reflected to the capacitor body 18 by the welding side portions 23*a*.

In this embodiment, the laser welder 57 includes the paired laser light irradiating portions 60 in order to irradiate only the respective welding side portions 23*a* of the connecting piece 21 with laser beams B. It is preferable for the laser welder 57 to generate laser light B such that output energy thereof in a range from 0.2 to 0.5 (J) is obtained in a spot laser area having diameter of 0.15 mm.

In the welding step, the capacitor element 14 is mounted on the reed frame 41 by putting the anode lead 17 in the welding notch 23*b* of the connecting portion 21 of the anode lead terminal 42 and adhering the capacitor element 14 to the bottom plate portion 30 and the mounting plate portion 31 of the cathode lead terminal 43, which are coated with the electrically conductive adhesive, as shown in FIG. 4. In this state, the reflector arranging machine 52 lowers the reflector 51 while the reflector 51 is guided by the anode lead 17 along the slot 54 to position the reflection plate 53 in between the welding side portions 23a and the capacitor body 18 to thereby cover the capacitor body 18, as shown in FIG. 5 and FIG. 6. In this case, the reflector-arranging machine 52 operates to urge the anode lead 17 to the connecting portion 21 through the end portion 55 of the slot 54 of the reflection plate 53.

In this state, the laser welder 57 disposed above the reflector 51 as shown in FIG. 6 melts the welding side portions 23a of the connecting portion 21 by irradiating them with laser lights B from the laser irradiating portions 60 such that molten material of the welding side portions flows around the anode lead 17 in the welding notch 23b. Thereafter, the laser irradiation is stopped to solidify the molten material of the welding side portions 23a around the anode lead 17 to thereby weld the connecting portion 21 and the anode lead 17 together.

Thereafter, mutually opposing portions of the anode lead terminal 42 and the cathode lead terminal 43, that is, a portion including the connecting portion 21, the side portions 20 and the bottom plate portion 22 of the anode lead terminal 42 and a portion including the bottom plate portion 30 and the mounting plate portion 31 of the cathode lead terminal 43 and the capacitor element 14 connected to the cathode lead terminal 43 and the anode lead terminal 42 are molded by the external resin 15 and, then, the molded structure is cut away from the reed frame, resulting in the chip type solid electrolytic capacitor 11.

According to this embodiment described above, in which the reflector arranging machine 52 lowers the reflector 51 along the guidance of the anode lead 17 received in the slot 54 of the reflection plate 53 to position the reflection plate 53 in a region between the welding side portions 23a and the capacitor body 18 to thereby cover the capacitor body 18 by the reflector 51 and the reflector arranging machine 52 operates to urge the anode lead 17 to the connecting portion 21 through the end portion 55 of the slot 54 of the reflection plate 53, the laser welder 57 can always perform the welding operation while the anode lead 17 is in firm contact with the connecting portion 21. Therefore, degradation of bonding strength between the anode lead 17 and the connecting portion 21 can be avoided. Further, since the reflector 51 including the reflection plate 53 forms a heat sink for absorbing heat transmitted through the anode lead 17 during the welding operation, degradation of the quality of the capacitor body 18 is prevented more reliably.

Therefore, it is possible to obtain a high quality chip type solid electrolytic capacitor 11.

Moreover, it is possible to improve the freedom of irradiating direction of laser light since the anode lead 17 is pressed by the reflection plate 53 in the region between the welding side portions 23a and the capacitor body 18.

In addition, the pressing force of the reflection plate 53 exerted on the anode lead 17 is selected in the order for correcting bending, etc., of the anode lead 17. When a plurality of capacitor bodies 18 bonded to an aluminum holder are processed through respective fabrication steps, anode leads 17 thereof are not in one and the same horizontal plane due to bending or warping of the bonding portions of the anode leads to the aluminum holder and, therefore, the contact of the anode lead terminals 42 with the connecting pieces 21 is unstable. According to the present invention, such bending and/or warping of the anode lead 17 can be corrected since the welding operation can be performed in the state where the anode lead 17 is always in firm contact with the connecting portion 21.

Chip type solid electrolytic capacitors fabricated with and without using the reflection plate 53 were tested on LC defect thereof. When fifteen chip type capacitors were fabricated without using the reflection plate 53, the number of capacitors having LC defect was seven, showing defect ratio is about 47%. On the other hand, when twelve chip type capacitors were fabricated with using the reflection plate 53, the number of capacitors having LC defect was one, showing defect ratio is about 8%.

In addition, since the laser welder 57 irradiates only the welding side portions 23a of the connecting portion 21 with laser light to melt them and flow around the anode lead 17, the bonding strength is stabilized and the utility of thereof is improved. Further, it becomes possible to restrict temperature rise of the anode lead 17 to the irreducible minimum of the demand to thereby minimize temperature rise of the capacitor body 18 of the capacitor element 14 due to the temperature rise of the anode lead 17. Therefore, degradation of the quality of the capacitor body 18 can be avoided.

Consequently, it becomes possible to obtain a high quality chip type solid electrolytic capacitor 11.

The embodiment of the present invention described hereinbefore can be modified in various manners.

Figure 8:
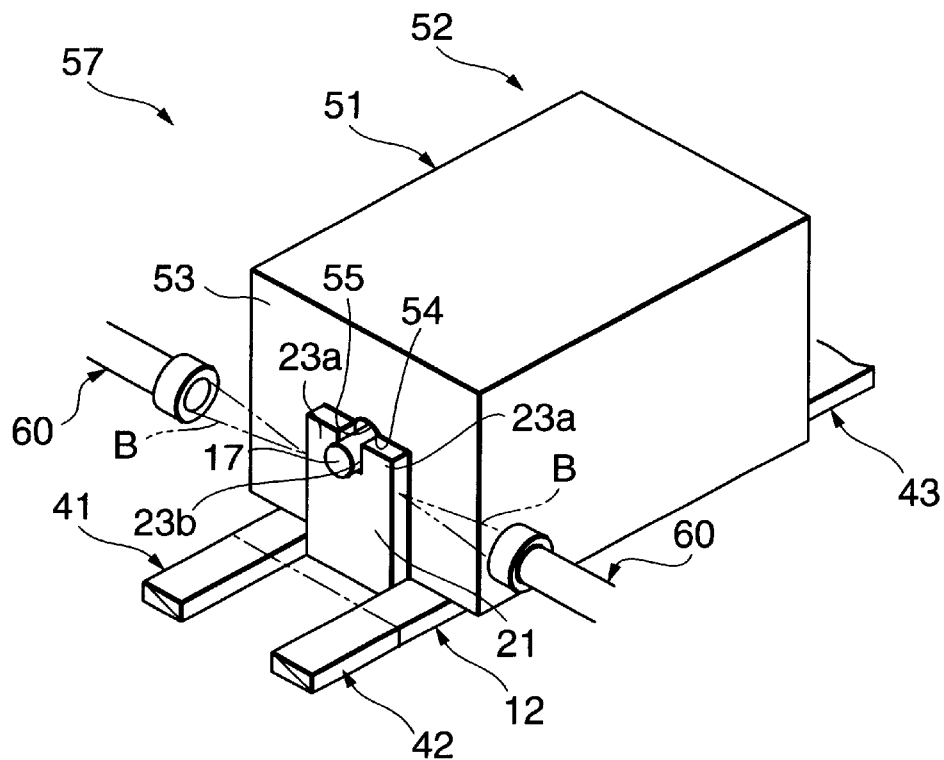
FIG. 8 is a perspective view of another example of the laser welder of a fabrication apparatus according to an embodiment of the present invention.
Figure 9:
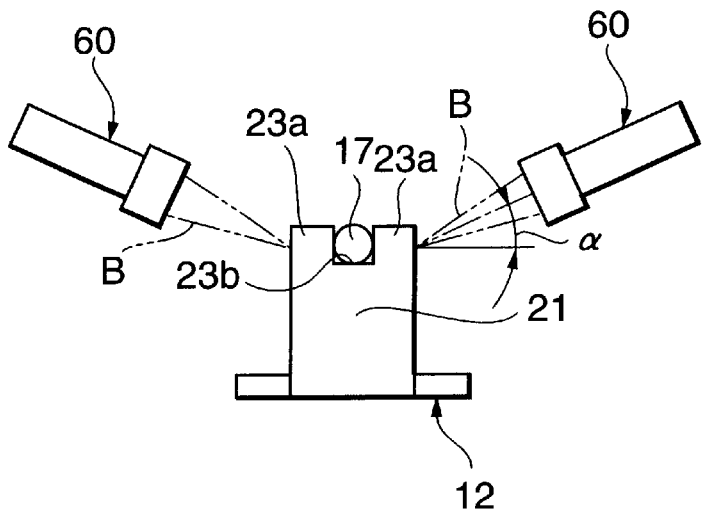
FIG. 9 is a front view of another example of a laser welder of a fabrication apparatus according to an embodiment of the present invention.

That is, in lieu of the construction in which the two laser light irradiating portions 60 are arranged above the two welding side portions 23a to irradiate them with downward laser lights B from the respective laser light irradiating portions, the laser light irradiating portions 60 may be arranged on both sides of the welding side portions 23a in the widthwise direction of the capacitor in a mutually opposing relation as shown in FIG. 8 to irradiate the welding side portions 23a with lateral laser lights B from the respective laser light irradiating portions 60. In such case, laser lights are directed to only the welding side portions 23a of the connecting portion 21. In such modification, the effect similar to that obtainable by the described embodiment can be obtained. Further, since the welding operation is performed by directing laser lights B to the sides of the respective welding portions 23a, it is possible to effectively flow molten welding side portions 23a in molten state around the anode lead 17 in the welding notch 23b. In this modification, it is preferable that an angle α of an optical axis of each laser light B with respect to a horizontal direction is 30 degrees as shown in FIG. 9. It has been found that the capacitor having LC defect can be eliminated when the welding operation is performed by directing the laser lights to the respective welding side portions 23a with the optical axis angle α being 30 degrees.

Figure 10:
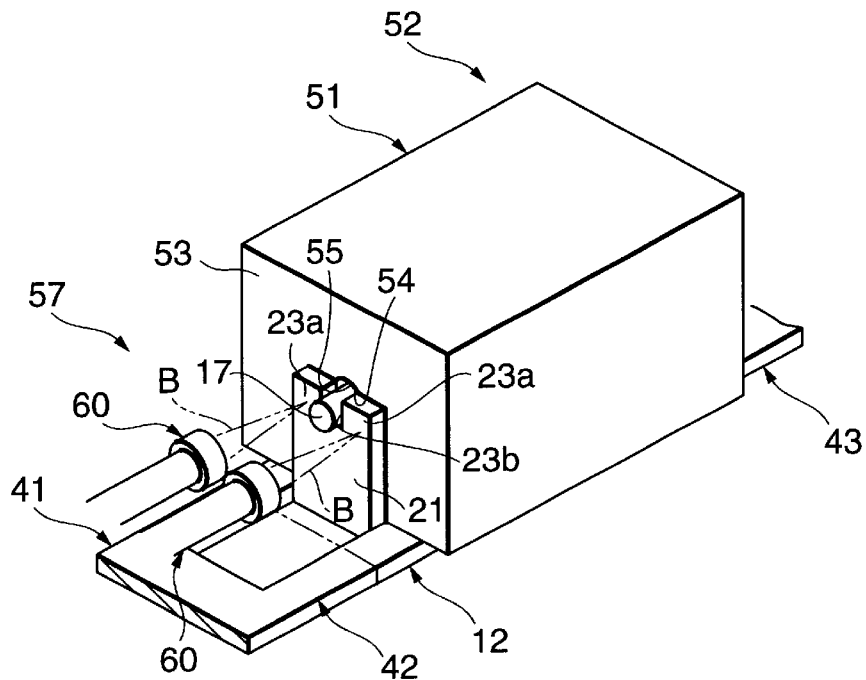
FIG. 10 is a perspective view of another example of the laser welder of a fabrication apparatus according to an embodiment of the present invention.

Alternatively, the two laser irradiating portions 60 may be arranged in parallel on the same side as that of the welding side portions 23a in lengthwise direction of capacitor such that front portions of the welding side portions 23a are irradiated with laser lights B from the laser light irradiating portions 60, respectively, as shown in FIG. 10. In this modification, only the welding side portions 23a of the connecting portion 21 are irradiated with laser lights B. It is possible to obtain similar effect to that obtainable in this embodiment with this modification.

Figure 11:
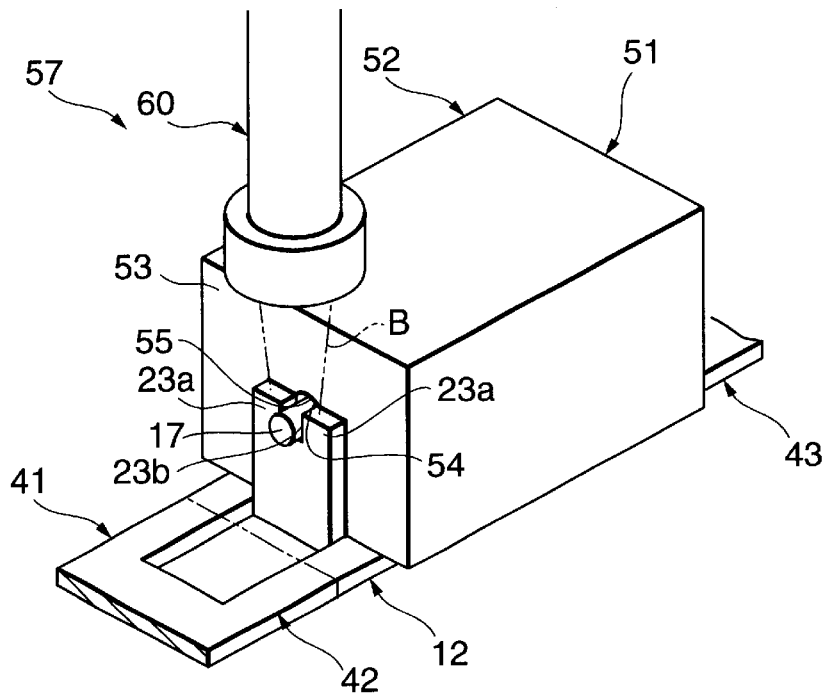
FIG. 11 is a perspective view of another example of the laser welder of a fabrication apparatus according to an embodiment of the present invention.

Alternatively, it is possible to perform the welding operation by irradiating the welding side portions 23a with laser light B having a predetermined cross section and emitted from a single laser light irradiating portion 60 arranged above the welding side portions 23a to melt the welding side portions 23a at once, as shown in FIG. 11. In such case, since the anode lead 17 is irradiated with laser light B simultaneously with irradiation of the welding side portions 23a, temperature rise of the anode lead 17 may be increased to some extent compared with the case where only the welding side portions 23a of the connecting portion 21 is irradiated with laser light. In such case, however, the cost of the laser welder 57 can be reduced. This modification can be applied to the case shown in FIG. 10.

Figure 12:
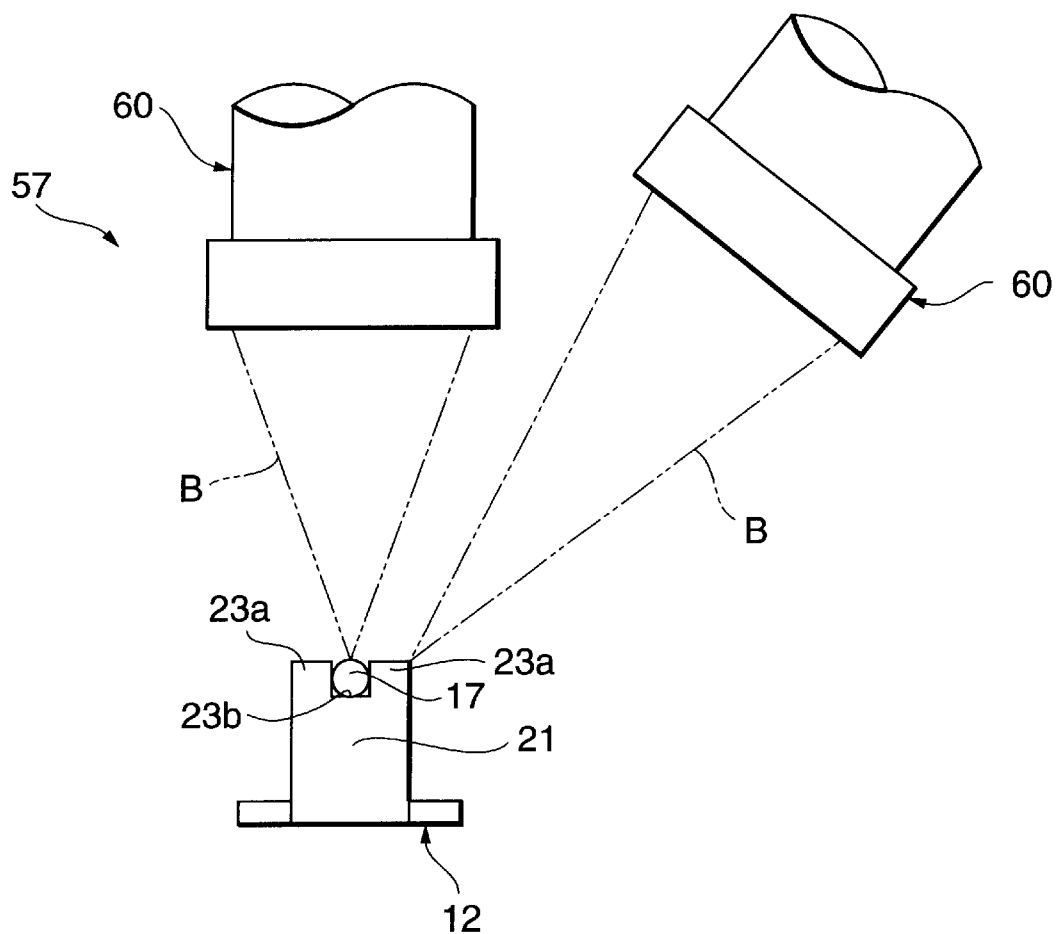
FIG. 12 is a front view of another example of a laser welder of a fabrication apparatus according to an embodiment of the present invention.

Alternatively, it is possible to construct the apparatus such that one of the laser light irradiating portions 60 of the laser welder 57, which are arranged above the welding side portions 23a of the connecting portion 21, obliquely irradiates the respective welding side portions 23a with laser light B of low energy density and the other laser light irradiating portion 60 vertically irradiates the anode lead 17 with laser light B of high energy density, as shown in FIG. 12. Alternatively, it is possible to construct the apparatus such that the laser light irradiating portions 60 obliquely irradiates the respective welding side portions 23a with laser light B of energy density and another laser light irradiating portion 60 additionally provided above the anode lead 17 vertically irradiates the anode lead 17 with laser light B of high energy density.

By irradiating the welding side portions 23a of the connecting portion 21 with laser light B of low energy density in a range from 1670 to 2500 J/cm$^2$ and, simultaneously, irradiating the anode lead 17 with laser light B of high energy density in a range from 1700 to 2800 J/cm$^2$, in this manner, it is possible to melt the anode lead 17 formed of tantalum having high melting point (about 3000° C.) and the welding side portions 23a formed of nickel-iron alloy having low melting point (about 1500° C.) and to weld them together. Therefore, it is possible to obtain higher quality chip type solid electrolytic capacitor 11.

Figure 13:
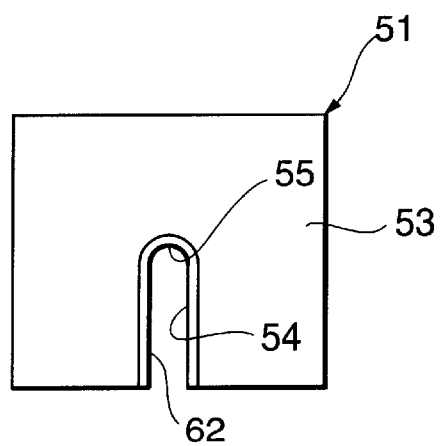
FIG. 13 is a front view of another example of a reflector of a fabrication apparatus according to an embodiment of the present invention.

Further, by additionally forming a layer 62 of industrial diamond or silicon carbide on an inner peripheral face of the slot 54 of the reflection plate 53 of the reflector 51 by vapor-deposition or sputtering, etc., as shown in FIG. 13, bonding of the anode lead 17 to the reflector 51 can be prevented by the layer 62 even when temperatures of the anode lead 17 and the reflector 51 rise during the laser welding operation.

As described in detail hereinbefore, according to the first aspect of the method for fabricating a chip type solid electrolytic capacitor according to the present invention, the welding operation is performed by laser light while the anode lead is urged to the connecting portion. Therefore, it is possible to always perform the welding operation in a state where the anode lead and the connecting portion are in firm contact, so that degradation of the bonding strength is prevented.

Consequently, it is possible to obtain a high quality chip type solid electrolytic capacitor.

In addition thereto, it is possible to increase the freedom of irradiating direction of laser light since the anode lead is pressed in a region between the welding side portions and the capacitor body. Further, as mentioned previously, since, according to the present invention, bending or warping of the anode lead, which occurs when a plurality of capacitor bodies bonded to an aluminum holder, are processed through respective fabrication steps, anode leads thereof are not in one and the same horizontal plane due to bending or warping of the bonding portions of the anode leads to the aluminum holder and, therefore, the contact of the anode lead terminals with the connecting pieces is unstable, can be corrected, the welding operation can be performed in the state where the anode lead is always in firm contact with the connecting portion.

According to the second aspect of the present invention in which the laser welding operation is performed in the state where the reflection plate having the slot is arranged between the welding side portions and the capacitor body while the anode lead is received in the slot, the reflection plate prevents irradiation of the capacitor body with reflected laser light, so that degradation of the capacitor body is prevented. Consequently, it is possible to obtain a high quality chip type solid electrolytic capacitor.

According to the third aspect of the present invention in which the laser welding operation is performed in the state where the reflection plate having the slot is arranged in the region between the welding portions and the capacitor body while the anode lead is received in the slot and the anode lead is urged to the connecting portion, the bending and/or warping of the anode lead, which occurs when a plurality of capacitor bodies bonded to an aluminum holder are processed through respective fabrication steps and makes the contact of the anode lead terminals with the connecting pieces unstable, can be corrected, the welding operation can be performed in the state where the anode lead is always in firm contact with the connecting portion. As a result, degradation of bonding strength between the anode lead and the connecting portion can be avoided. Further, since the reflection plate prevents irradiation of the capacitor body with reflected laser light, degradation of the quality of the capacitor body is prevented.

Therefore, it is possible to obtain a high quality chip type solid electrolytic capacitor.

According to the fabrication method of a chip type solid electrolytic capacitor according to the fourth aspect of the present invention in which only the welding side portions of the connecting portion are irradiated with laser light, the welding side portions are melted and flow around the anode lead, so that the bonding strength is stabilized and the utility of thereof is improved. Further, it becomes possible to restrict temperature rise of the anode lead to the irreducible minimum of the demand to thereby minimize temperature rise of the capacitor body of the capacitor element due to the temperature rise of the anode lead. Therefore, degradation of the quality of the capacitor body can be avoided.

Consequently, it becomes possible to obtain a higher quality chip type solid electrolytic capacitor.

According to the fabrication method of a chip type solid electrolytic capacitor according to the fifth aspect of the present invention in which the connecting portion is irradiated with low energy density laser light and the anode lead is irradiated with high energy density laser light, it is possible to desirably melt and bond the connecting portion and the anode lead, which have different melting points.

Therefore, it is possible to obtain a higher quality chip type solid electrolytic capacitor.

According to the fabrication apparatus of a chip type solid electrolytic capacitor according to the sixth aspect of the present invention in which the laser welding operation is performed while the anode lead is urged to the connecting portion by the pressing means, it is possible to weld the anode lead to the connecting portion while the anode lead is in firm contact with the connecting portion. Therefore, degradation of bonding strength is prevented.

Consequently, it is possible to obtain a high quality chip type solid electrolytic capacitor.

Further, since, in this apparatus, the anode lead is fittingly held in the region between the welding side portions and the capacitor body, it is possible to improve the freedom of irradiating direction of laser light. In this case, the bending and/or warping of the anode lead, which occurs when a plurality of capacitor bodies bonded to an aluminum holder are processed through respective fabrication steps and makes the contact of the anode lead terminals with the connecting pieces unstable, can be corrected, the welding operation can be performed in the state where the anode leads are always in firm contact with the connecting portion.

According to the fabrication apparatus of a chip type solid electrolytic capacitor according to the seventh aspect of the present invention in which the laser welding operation is performed by the laser welding means in the state where the reflection plate having the slot is arranged in the region between the welding side portions and the capacitor body while the anode lead is received in the slot, the reflection plate prevent irradiation of the capacitor body with reflected laser light, so that degradation of the capacitor body is prevented.

Consequently, it is possible to obtain a high quality chip type solid electrolytic capacitor.

According to the fabrication apparatus of a chip type solid electrolytic capacitor according to the eighth aspect of the present invention in which the laser welding operation is performed by the laser welding means in the state where the reflection plate having the slot is arranged in the region between the welding side portions and the capacitor body while the anode lead is received in the slot and the anode lead is urged to the connecting portion by the reflection plate, the bending and/or warping of the anode lead, which occurs when a plurality of capacitor bodies bonded to an aluminum holder are processed through respective fabrication steps and makes the contact of the anode lead terminals with the connecting portions unstable, can be corrected, the welding operation can be performed in the state where the anode lead is always in firm contact with the connecting portion. As a result, unstableness and degradation of the bonding strength can be avoided.

Consequently, it is possible to obtain a high quality chip type solid electrolytic capacitor.

According to the fabrication apparatus of a chip type solid electrolytic capacitor according to the ninth aspect of the present invention in which the laser welding means irradiates only the welding side portions of the connecting portion with laser light, the welding side portions are melted and flow around the anode lead, so that the bonding strength is stabilized and the utility of thereof is improved. Further, it becomes possible to restrict temperature rise of the anode lead to the irreducible minimum of the demand to thereby minimize temperature rise of the capacitor body of the capacitor element due to the temperature rise of the anode lead. Therefore, degradation of the quality of the capacitor body can be avoided.

Consequently, it becomes possible to obtain a higher quality chip type solid electrolytic capacitor.

According to the fabrication apparatus of a chip type solid electrolytic capacitor according to the tenth aspect of the present invention in which the laser welding means irradiates the connecting portion with low energy density laser light and the anode lead with high energy density laser light, it is possible to desirably melt and bond the connecting portion and the anode lead, which have different melting points.

Therefore, it is possible to obtain a higher quality chip type solid electrolytic capacitor.

What is claimed is:

1. A method for fabricating a chip type capacitor, wherein said method comprises:

mounting an anode lead of a capacitor element having a capacitor body and said anode lead protruding from said capacitor body on a connecting portion disposed on a portion of an anode terminal of said chip type capacitor;

arranging a reflection plate having a slot in a region between said connecting portion and said capacitor body while said anode lead is received in said slot, said reflection plate reflecting reflected laser light; and welding said anode lead and said connecting portion together by laser light while said anode lead is urged to said connecting portion.

2. A method for fabricating a chip type capacitor as claimed in claim 1, wherein said anode lead is urged to said connecting portion by said reflection plate.

3. A method for fabricating a chip type capacitor as claimed in claim 2, wherein said reflection plate exerts a pressing force less than or equal to 50 MPa on said anode lead.

4. A method for fabricating a chip type capacitor as claimed in claim 1, wherein said connecting portion has a welding notch for mounting said anode lead thereon and welding side portions formed on respective sides of said welding notch.

5. A method for fabricating a chip type capacitor as claimed in claim 1, wherein laser light irradiates only said welding side portions.

6. A method for fabricating a chip type capacitor as claimed in claim 5, wherein laser light irradiates said welding side portions at an angle of approximately 30 degrees from a horizontal plane.

7. A method for fabricating a chip type capacitor as claimed in claim 1, wherein said connecting portion is irradiated with low energy density laser light and said anode lead is irradiated with high energy density laser light.

8. A method for fabricating a chip type capacitor as claimed in claim 7, wherein said low energy density laser light has an energy density of 1670 to 2500 $J/cm^2$.

9. A method for fabricating a chip type capacitor as claimed in claim 7, wherein said high energy density laser light has an energy density of 1700 to 2800 $J/cm^2$.

10. A method for fabricating a chip type capacitor as claimed in claim 1, wherein said reflection plate is arranged to cover a substantial portion of said capacitor body.

11. A method for fabricating a chip type capacitor as claimed in claim 1, wherein said reflection plate is arranged to cover a portion of said capacitor body that would otherwise be exposed to reflected laser light.

12. A method for attaching a capacitor having a capacitor body to a reed frame, wherein said method comprises:

mounting a lead that protrudes from the capacitor body in a terminal of said reed frame;

arranging a reflection plate having a slot in a region between said terminal and said capacitor body while said lead is received in said slot, said reflection plate reflecting reflected laser light; and welding said lead and said terminal together by laser light while said lead is urged to said terminal.

13. The method as claimed in claim 12, wherein said lead is urged to said terminal by said reflection plate.

14. The method as claimed in claim 13, wherein said reflection plate exerts a pressing force less than or equal to 50 MPa on said lead.

15. The method as claimed in claim 12, wherein said terminal has a welding notch for mounting said lead thereon and welding side portions disposed on respective sides of said welding notch.

16. The method as claim 15, wherein laser light irradiates only said welding side portions.

17. The method as claimed in claim 15, wherein laser light irradiates said welding side portions at an angle of approximately 30 degrees from a horizontal plane.

18. The method as claimed in claim 12, wherein said reflection plate is arranged to cover a substantial portion of said capacitor body.

19. The method as claimed in claim 12, wherein said reflection plate arranged to cover a portion of said capacitor body that would otherwise be exposed to reflected laser light.

20. The method as claimed in claim 12, wherein said terminal is irradiated with low energy density laser light and said lead is irradiated with high energy density laser light.

21. The method as claimed in claim 20, wherein said low energy density laser light has an energy density of 1670 to 2500 $J/cm^2$.

22. The method as claimed in claim 20, wherein said high energy density laser light has an energy density of 1700 to 2800 $J/cm^2$.

* * * * *